United States Patent
Nahill

(10) Patent No.: US 7,563,403 B2
(45) Date of Patent: Jul. 21, 2009

(54) METHOD OF REHEAT BLOW MOLDING A CONTAINER

(75) Inventor: Thomas E. Nahill, Amherst, NH (US)

(73) Assignee: Graham Packaging PET Technologies, Inc., Toledo, OH (US)

( * ) Notice: Subject to any disclaimer, the term of this patent is extended or adjusted under 35 U.S.C. 154(b) by 714 days.

(21) Appl. No.: 10/884,777

(22) Filed: Jul. 2, 2004

(65) Prior Publication Data

US 2006/0001196 A1    Jan. 5, 2006

(51) Int. Cl.
 *B29C 49/06* (2006.01)
 *B29C 49/32* (2006.01)
(52) U.S. Cl. .................. 264/531; 264/535; 264/537
(58) Field of Classification Search .................. 264/531, 264/535, 537
See application file for complete search history.

(56) References Cited

U.S. PATENT DOCUMENTS

| | | | |
|---|---|---|---|
| 3,973,896 A | 8/1976 | Peters | |
| 4,177,239 A | 12/1979 | Gittner et al. | |
| 4,510,116 A | * 4/1985 | Peters et al. | 264/529 |
| 4,938,680 A | 7/1990 | Guarriello et al. | |
| 4,964,522 A | 10/1990 | Umetsu et al. | |
| 5,106,569 A | 4/1992 | Rathman et al. | |
| 5,469,612 A | * 11/1995 | Collette et al. | 29/453 |
| 5,533,881 A | 7/1996 | Collette et al. | |
| 5,637,167 A | 6/1997 | Krishnakumar et al. | |
| 6,143,235 A | 11/2000 | Birkert | |
| 6,435,856 B1 | 8/2002 | Zellers et al. | |
| 6,479,010 B1 | 11/2002 | Golovoy et al. | |

FOREIGN PATENT DOCUMENTS

| | | |
|---|---|---|
| EP | 026914 | 6/1986 |
| EP | 0346518 | 6/1988 |
| EP | 0626248 | 4/1994 |
| FR | 1237243 | 7/1960 |
| JP | 57201632 | 12/1982 |
| WO | WO94/23917 | 10/1994 |
| WO | WO96/30189 | 10/1996 |

OTHER PUBLICATIONS

Patent Abstracts of Japan, vol. 017, No. 552 (M-1491), Oct. 5, 1993 & JP 05 154897 A (Yoshino Kogyosho Co Ltd), Jun. 22, 1993, figures 1, 2.

* cited by examiner

*Primary Examiner*—Suzanne E. McDowell
(74) *Attorney, Agent, or Firm*—Knoble Yoshida & Dunleavy, LLC

(57) ABSTRACT

A method of reheat blow molding a container includes the step of positioning a preform in a blow mold cavity with at least one of the walls having an opening with an anvil received therein for movement between a first position outside the cavity and a second position at least partially within the cavity. Further, expanding the preform within the cavity while moving the anvil from its first position to its second position so that the expanding preform forms a pocket for receiving a handle therein.

18 Claims, 3 Drawing Sheets

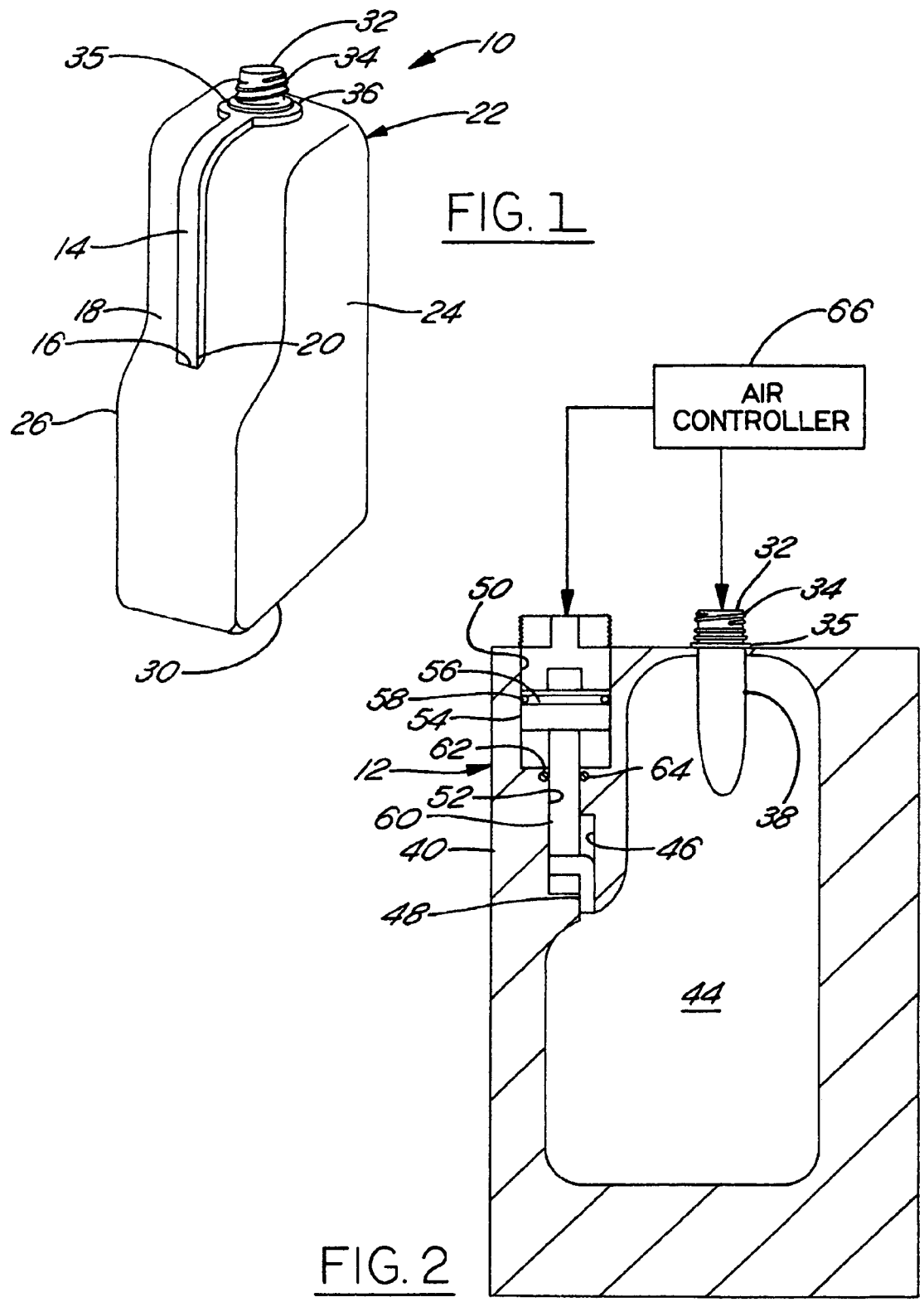

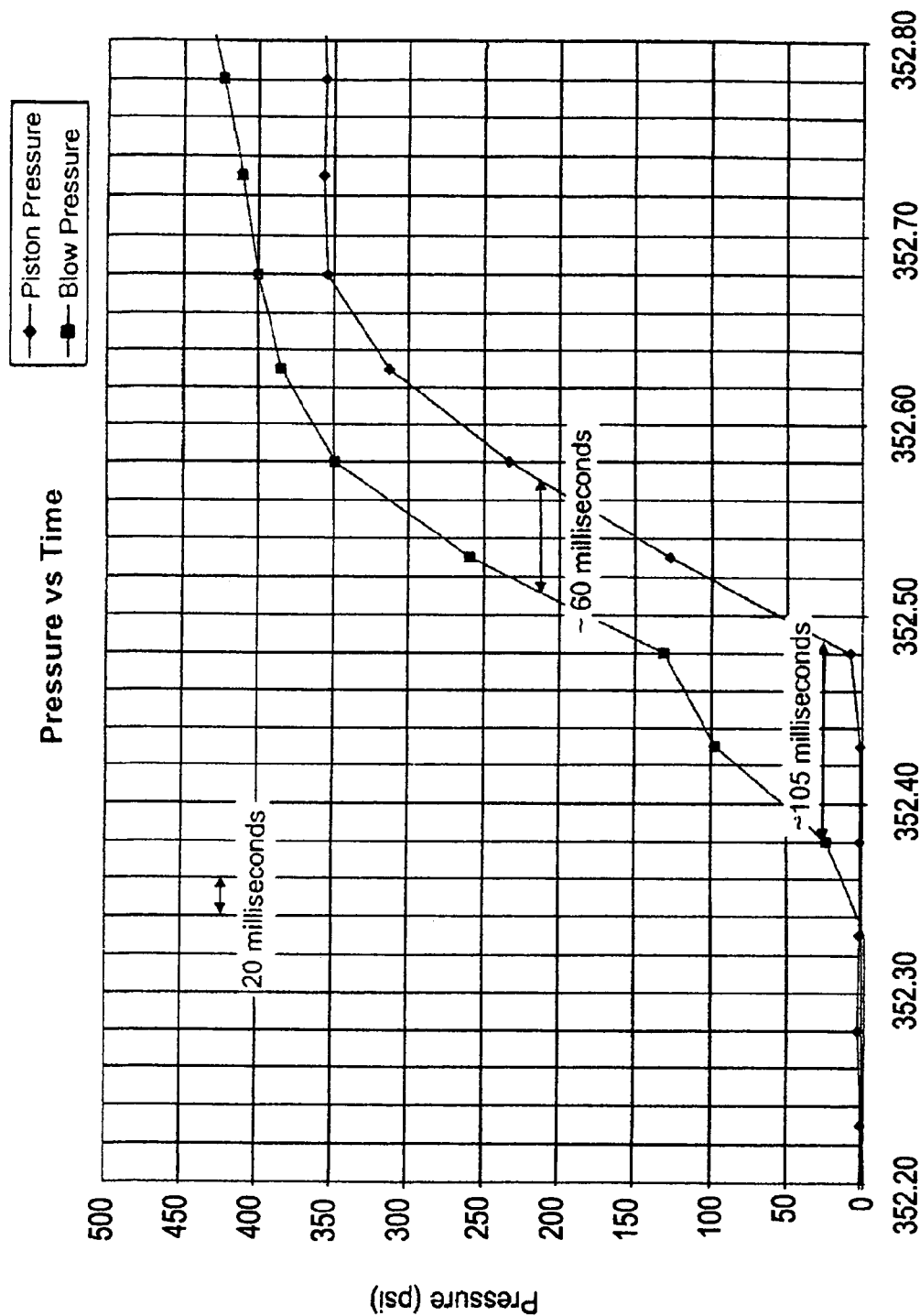

METHOD OF REHEAT BLOW MOLDING A CONTAINER

FIELD OF THE INVENTION

This invention relates generally to methods for forming a blow molded container, and more particularly to methods for forming a reheat blow molded container having a handle.

BACKGROUND AND SUMMARY OF THE INVENTION

Blow molded containers are commonly used for holding various products, such as beverages and detergents, due to their light weight and impact resistant nature, and largely because they are economical in manufacture. To make the containers easier to carry, handles are commonly formed with or attached to the containers. By adding a handle to a container, the manufacturing of the containers is made more complex, thereby increasing the overall cost associated with their manufacture.

In particular, when manufacturing a container with a strain-hardenable material, such as polyethylene terephthalate (PET), for example, the ability to incorporate a handle on the container is further complicated. This results from the strain hardening mechanical properties inherent of PET as it is expanded during blow molding. As a result of the strain hardening, it is difficult to form pockets within the container during the blow molding process sized for receipt of a handle. Commonly, attempts to form pockets result in holes being formed during the blow molding process, thereby resulting in scrap. In addition, due to the mechanical properties of strain-hardening materials, it is difficult to form pockets deep enough to provide secure attachment of a handle within the pocket. As such, handles are commonly attached to blow molded containers by incorporating the handle within the blow mold so that the handle becomes attached to the container in the blow molding process. Unfortunately, this complicates the manufacturing process, thereby increasing the manufacturing costs.

A method of reheat blow molding a container includes the step of positioning a preform in a blow mold cavity defined by a pair of mold halves wherein at least one of the mold halves has an opening with an anvil received therein for movement between a first position outside the cavity and a second position at least partially within the cavity. The preform is expanded within the cavity until the preform conforms substantially to the shape of the cavity defined by the mold halves. While expanding the preform, the anvil is moved from its first position to its second position so that the expanding preform forms a continuous wall around the anvil and provides the container with a pocket for receiving a handle therein. Preferably, the pocket within the container is free of holes and of a depth to insure retention of the handle while in use.

BRIEF DESCRIPTION OF THE DRAWINGS

These and other objects, features, advantages and aspects of the present invention will be apparent from the following detailed description of the preferred embodiments and best mode, appended claims and accompanying drawings in which:

FIG. 1 is a perspective view of a container formed using a method of reheat blow molding according to one aspect of the invention;

FIG. 2 is a schematic cross-sectional view of a blow mold according to one preferred embodiment of the invention having a preform positioned at least partially therein and showing an anvil in a first position;

FIG. 5 is a graph representing pressure in a blow mold verses pressure in a piston bore over time, with a differential in the pressures causing a delay in the movement of the anvil relative to the expansion of the preform.

DETAILED DESCRIPTION OF THE PREFERRED EMBODIMENTS

Figure 4:
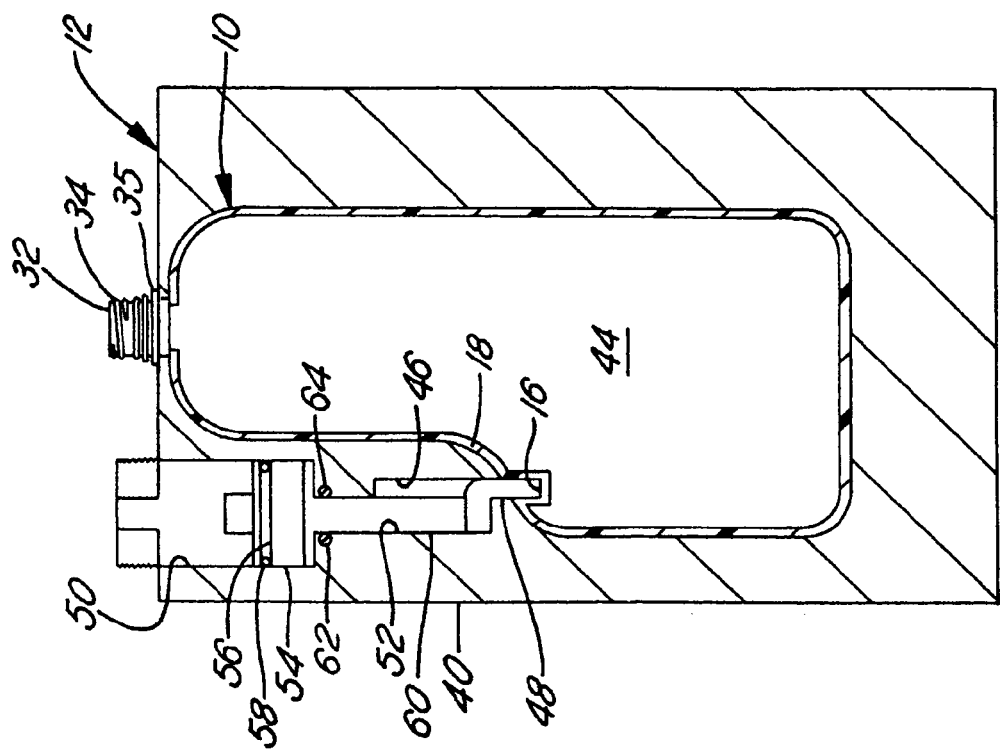
FIG. 4 is a view similar to FIG. 2 and illustrates the preform fully expanded and the anvil in its second position.

Referring in more detail to the drawings, FIG. 1 illustrates a container 10 constructed according to one aspect of the invention. The container 10 is formed in a blow mold 12 (FIGS. 2-4) using a reheat blow molding process. To facilitate reducing the costs associated in forming the container 10, the container 10 is constructed for receipt of a handle 14 in a secondary post-molding operation. To facilitate attachment of the handle 14 to the container 10, at least one pocket 16 (FIGS. 1 and 4) is formed in a wall, shown here as a sidewall 18 of the container 10, for secure attachment of the handle 14 within the pocket 16. Upon attachment of at least one end 20 of the handle 14 within the pocket 16, the container 10 is easily carried by the handle 14 in use.

The container 10 is preferably formed from a strain-hardenable material, such as polyethylene terephthalate (PET), which is a copolymer, and copolymers such as polybutylene terephthalate, polyethylene naphthalate (PEN), nylon-6, and nylon-6,6, for example. As shown in FIG. 1, the finished container 10 has a body 22 with a wall, shown here as having a front wall 24 and a back wall 26 with the sidewall 18 and a base 30 extending therebetween. The container has a neck finish 32 preferably constructed with external threads 34 to receive a closure (not shown) and a radially outwardly extending flange 35. The handle 14 has one end 20 received in the molded pocket 16, and an annular flange 36 at its other end sized for receipt around the finish 32. It should be recognized that the handle 14 may be constructed other than as shown here, such as having both ends received in molded pockets, or having both ends received in a single molded pocket, for example. It should also be recognized that the container body 22 could be formed in any desired shape and size.

As shown in FIG. 2, the method of forming the container includes positioning a parison or preform 38 in the blow mold 12. Preferably, the preform 38 includes the neck finish 32, threads 34 and the flange 35 thereon for receipt in a collet (not shown) of the blow mold 12. The blow mold 12 has at least two mold halves 40 separable from one another and defining a blow mold cavity 44 therebetween. At least one mold half 40 has an opening 46 sized to receive an anvil 48 therein for movement between a first position (FIG. 2) wherein the entire anvil 48 is preferably outside the cavity 44 and a second position (FIG. 4) wherein at least a portion of the anvil 48 is disposed within the cavity 44. The opening 46 may be defined by both mold halves 40 along the parting line, or entirely within either one of the mold halves 40 to form a pocket adjacent to or spaced from the parting line. The mold half 40 may also incorporate a piston bore 50 with a passage 52 communicating the opening 46 with the piston bore 50. The piston bore 50 is sized to receive a piston 54 therein for axial movement between a retracted position (FIG. 2), corresponding to the first position of the anvil 48, and an extended position (FIG. 4), corresponding to the second position of the anvil 48. Desirably, the piston 54 has an annular groove 56 for receipt of a seal 58, such as an O-ring, to provide an airtight seal between the piston 54 and the piston bore 50. The piston 54 is preferably attached to the anvil 48 by a piston rod 60. Accordingly, the anvil 48 moves conjointly with the piston 54 via the piston rod 60. Desirably, an annular groove 62 is formed in the passage 52 and is sized for receipt of a seal 64, such as an O-ring, to provide an air-tight seal between the piston rod 60 and the passage 52. The piston 54 is preferably moved between the retracted and extended positions by way of pneumatic control. A source of pressurized air communicates with an air controller 66 (FIG. 2) to regulate the air flow into the cavity 44 and the piston bore 50.

Figure 3:
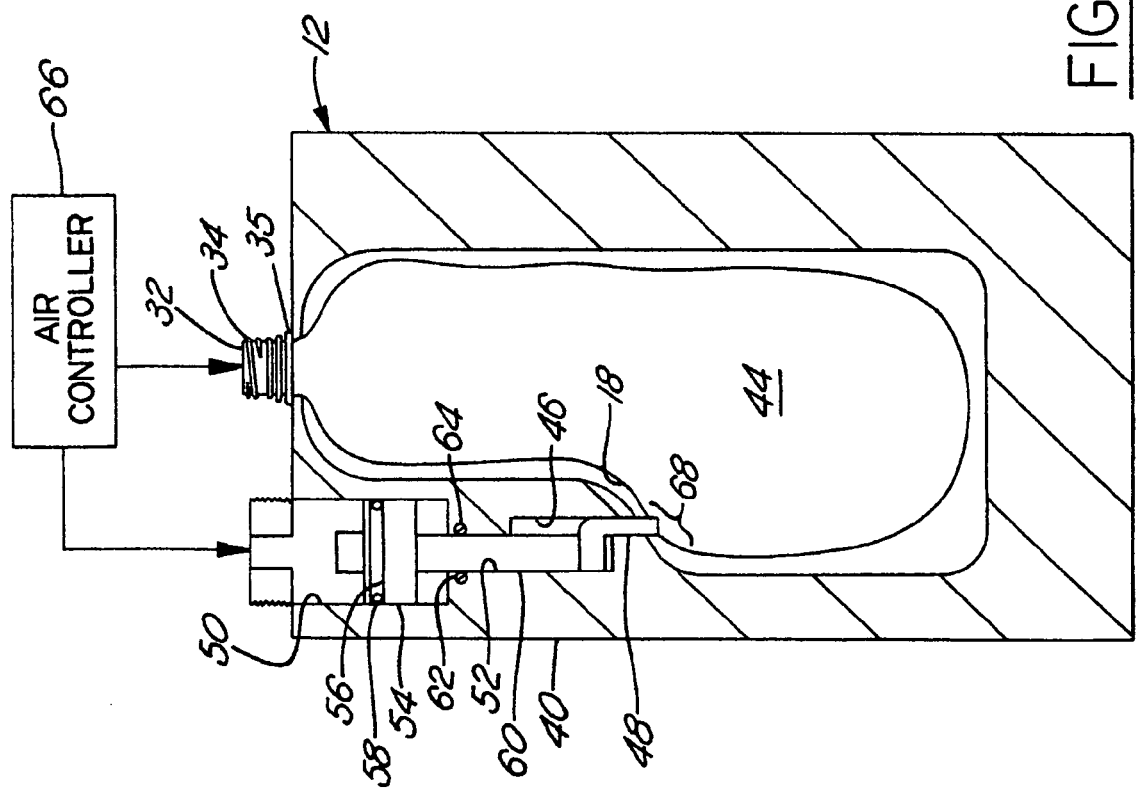
FIG. 3 is a view similar to FIG. 2 and illustrates the preform expanded partially and the anvil being moved toward a second position.

The air controller 66 preferably has valves (not shown) moveable between open and closed positions, such as solenoid valves, for example, to communicate the flow of air into the cavity 44 and the piston bore 50 preferably at preprogrammed and predetermined times. As shown graphically in FIG. 5, desirably the pressurized air is provided into the cavity 44 before pressurized air is provided into the piston bore 50 provides the pocket 16 as a well formed, deep and hole-free. The delay in providing pressurized air into the piston bore relative to the mold cavity creates a delay in the build-up of pressure. In the piston bore 50 relative to the mold cavity 44. Results from testing have shown that a delay of approximately 0.005 to 0.2 seconds, and preferably between 0.017 to 0.103 seconds in corresponding pressures between the mold cavity 44 and the piston bore 50, respectively, provides a pocket 16-as a well formed, deep and hole-free. Accordingly, the preform 38 begins to expand prior to the anvil 48 initiating its movement from its first position toward its second position. As shown in FIG. 3, when the preform 38 is expanded to a predetermined position, with at least a portion 68 of the preform 38 expanded generally beyond the opening 46 in the mold half 40, and before the preform 38 has fully expanded, air flow is directed into the piston bore 50 preferably by opening one of the valves in the air controller 66. The air pressure within the piston bore 50 moves the piston 54 toward its extended position, and thus, the anvil 48 from its first position toward its second position. The movement of the anvil 48 relative to the expanding preform 38 is controlled to prevent the anvil 48 from moving toward its second position too early, which would prevent the preform 38 from forming completely or fully around the anvil 48, as desired to form the pocket 16. Additionally, the movement of the anvil 48 needs to be controlled so that the anvil 48 does not initially contact the preform 38 too late, which would tend to form or punch a hole in the preform 38 (FIG. 5) as a result of the strain hardening and cooling of the container material, and in essence, rendering the piece as scrap.

As the piston 54 is driven from its retracted position toward its extended position, the anvil 48 preferably moves in a substantially linear path from its first position toward the expanding preform 38 as the portion 68 of the preform 38 expands generally laterally beyond the opening 46. Preferably, the anvil 48 moves at a constant rate and conjointly with the piston 54 along the linear path and in a single motion from its first position to its second position. As such, upon the anvil 48 contacting the portion 68 of the expanding preform 38 (FIG. 3), preferably the anvil 48 continues moving at a constant rate into the expanding preform 38 to its second position to fully form the pocket 16.

Preferably, just as the preform 38 is fully expanded within the cavity 44, the anvil 48 is moved to its fully extended second position to fully form the pocket 16. The preform 38 preferably forms completely around the anvil 48 so the preform fully engages the anvil 48 and the interior of the mold cavity 44, as shown in FIG. 4. After the preform is fully expanded to conform to the cavity 44, the anvil 48 is moved back along its linear path, and preferably in one motion back to its first position in response to the movement of the piston 54 from its extended position to its retracted position. The anvil 48 is preferably removed entirely from within the cavity 44, and the mold halves 40 of the blow mold 12 may be separated from one another so that the finished container 10 can be removed from the blow mold 12. Thereafter, the end 20 of the handle 14 may be inserted in the pocket 16 formed by the anvil 48 for secure attachment within the pocket 16. Preferably, while inserting the end 20 into the pocket 16, the annular flange 36 is received about the finish 32 to further provide secure attachment of the handle 14 to the container 10.

It should be recognized that upon reading the disclosure herein, one ordinarily skilled in the art of blow molding would readily recognize other embodiments than those disclosed herein, with those embodiments being within the scope of the claims that follow. Accordingly, this disclosure herein is intended to be exemplary, and not limiting. The scope of the invention is defined by any issued claims that stem at least in part from this disclosure.

The invention claimed is:

1. A method of reheat blow molding a container, including the steps of: (a) positioning a preform in a blow mold cavity having a wall opening and an anvil disposed outside of said cavity and positioned to move into said cavity through said opening; (b) expanding said preform within said cavity by application of gas under pressure to said preform, and (c) during step (b), moving said anvil into said cavity through said opening at a time during said step (b) such that the expanding preform forms around said anvil; and initiating step (c) so that at least a portion of said preform is expanded laterally beyond said opening when said anvil initially contacts said preform.

2. The method of claim 1 including completing step (c) as said preform conforms to the shape defined by said mold cavity.

3. The method of claim 1 including timing said step (c) empirically with said step (b) so that said preform forms around said anvil without forming a hole in the expanding preform.

4. The method of claim 1 including moving said anvil into said mold cavity through said opening in a single motion.

5. The method of claim 4 including moving said anvil into said mold cavity through said opening at a substantially constant rate.

6. The method of claim 4 including moving said anvil into said mold cavity through said opening in a substantially linear path.

7. The method of claim 1 including initiating step (b) prior to initiating step (c).

8. The method of claim 7 wherein step (b) is initiated between 0.017 and 0.103 seconds before step (c) is initiated.

9. The method of claim 1 wherein said preform is of strain-hardenable plastic construction.

10. The method of claim 1 wherein said mold cavity is defined by at least two separable walls and said opening is located in a single one of said at least two separable walls.

11. The method of claim 10 including forming a pocket spaced from a parting line defined by said at least two separable walls.

12. A method of reheat blow molding a container, including the steps of:

(a) positioning a preform of strain-hardenable plastic construction in a blow mold cavity defined by at least two separable walls with at least one of said walls having an opening with an anvil received therein for movement between a first position outside said cavity and a second position at least partially within said cavity;

(b) expanding said preform within said cavity until said preform conforms substantially to the shape defined by said at least two walls, and (c) during step (b), initiating movement of said anvil from said first position toward said second position after at least a portion of said preform is expanded laterally beyond said opening.

13. The method of claim 12 including timing step (c) empirically with step (b) so that said preform forms a continuous wall around said anvil without forming a hole in said preform.

14. The method of claim 12 including moving said anvil from said first position to said second position in a single motion.

15. The method of claim 12 including moving said anvil into its second position at generally the same time as said preform conforms substantially to the shape of said blow mold cavity.

16. The method of claim 12 wherein step (b) is initiated between 0.017 and 0.103 seconds before step (c) is initiated.

17. The method of claim 12 including arranging said opening in a single one of said at least two separable walls.

18. The method of claim 17 including forming a pocket spaced from a parting line defined by said at least two separable walls.

* * * * *